United States Patent [19]

Chujo

[11] Patent Number: 5,214,693
[45] Date of Patent: May 25, 1993

[54] MULTI-FREQUENCY SIGNAL RECEIVER AND A METHOD OF DETECTING THE MULTI-FREQUENCY SIGNAL

[75] Inventor: Kaoru Chujo, Hachioji, Japan

[73] Assignee: Fujitsu Limited, Kawasaki, Japan

[21] Appl. No.: 591,939

[22] Filed: Oct. 2, 1990

[30] Foreign Application Priority Data

Oct. 18, 1989 [JP] Japan ................... 1-269236

[51] Int. Cl.⁵ .............................................. H04M 1/50
[52] U.S. Cl. .................................... 379/386; 379/283; 379/351; 328/138
[58] Field of Search ................ 379/386, 351, 283; 340/825.74; 328/138

[56] References Cited

U.S. PATENT DOCUMENTS

| 3,710,031 | 1/1973 | Sellari, Jr. | 340/825.74 |
| 3,795,775 | 3/1974 | Cowpland | 379/351 X |
| 3,812,432 | 5/1974 | Hanson | 328/138 |
| 3,845,249 | 10/1974 | Sellari, Jr. | 379/351 X |
| 3,944,753 | 3/1976 | Proctor et al. | 379/351 |
| 4,206,323 | 6/1980 | Padgett et al. | 379/386 X |
| 4,386,239 | 5/1983 | Chien | 379/386 |
| 4,484,035 | 11/1984 | Graham et al. | 328/138 X |
| 4,599,495 | 7/1986 | Richards | 379/351 |
| 4,626,629 | 12/1986 | Premoli et al. | 328/138 |

FOREIGN PATENT DOCUMENTS

| 8401044 | 3/1984 | Int'l Pat. Institute | 340/825.74 |
| 0144493 | 6/1987 | Japan | 379/386 |
| 1-138889 | 5/1989 | Japan . | |
| 1-188194 | 7/1989 | Japan . | |
| 1-243690 | 9/1989 | Japan . | |
| 0305694 | 12/1989 | Japan | 379/386 |

Primary Examiner—James L. Dwyer
Assistant Examiner—M. Shehata
Attorney, Agent, or Firm—Staas & Halsey

[57] ABSTRACT

A multi-frequency signal receiver, and in particular a push-button signal receiver, is provided having a detector circuit and an amplitude variation supervisory circuit. The detector circuit has a group of band pass filters, each having a pass band corresponding to each elemental signal in the multi-frequency signal. The detector circuit also has a logic circuit for receiving each output from the band pass filters and outputting detected data of the multi-frequency signal. The amplitude variation supervisory circuit monitors the amplitude of an input signal for a predetermined duration and detects and holds the maximum value of the monitored amplitude. Then, the amplitude variation supervisory circuit detects when the amplitude of the input signal exceeds the maximum amplitude value to determine if the input signal is not the multi-frequency signal.

23 Claims, 6 Drawing Sheets

FIG. 1
*PRIOR ART*

| FREQUENCY (Hz) | | HIGH FREQ. GROUP | | | |
|---|---|---|---|---|---|
| | | 1209 | 1336 | 1477 | 1633 |
| LOW FREQ. GROUP | 697 | 1 | 2 | 3 | NOTE 1 |
| | 770 | 4 | 5 | 6 | " |
| | 852 | 7 | 8 | 9 | " |
| | 941 | * | 0 | # | " |

NOTE 1: RESERVED

MULTI-FREQUENCY SIGNAL RECEIVER AND A METHOD OF DETECTING THE MULTI-FREQUENCY SIGNAL

BACKGROUND OF THE INVENTION

1. Field of the Invention

The present invention relates to a receiver for detecting a multi-frequency signal, particularly to the receiver which has an improved function in detecting the multi-frequency signal, in which detection error is remarkably reduced.

The multi-frequency signal herein used is a signal which comprises at least two elemental signals having a different frequency. A push-button signal is known as a typical example of the multi-frequency signal, which is generated in a pushphone terminal and transmitted to a telephone exchanger as a dialing signal. The push-button signal widely used contains two signals of a different audio frequency and a combination of the frequencies corresponds to a specific selection of dialing of the pushphone terminal.

The multi-frequency signal receiver is used in such as a telephone exchanger and detects a numeral or other specific function comprised in the multi-frequency signal.

2. Description of the Related Art

The system using the push-button (hereinafter abbreviated as PB) signal in Japan is similar as that developed by the Bell Laboratories and has been utilized for practical application in the United States.

The system is briefly called a 4×4 signal method, in which frequencies of the PB signal are grouped into two, a low frequency group and a high frequency group. Each group has four elemental frequencies, and the PB signal is formed by a combination of two elemental frequencies selected from each group.

Figure 1:
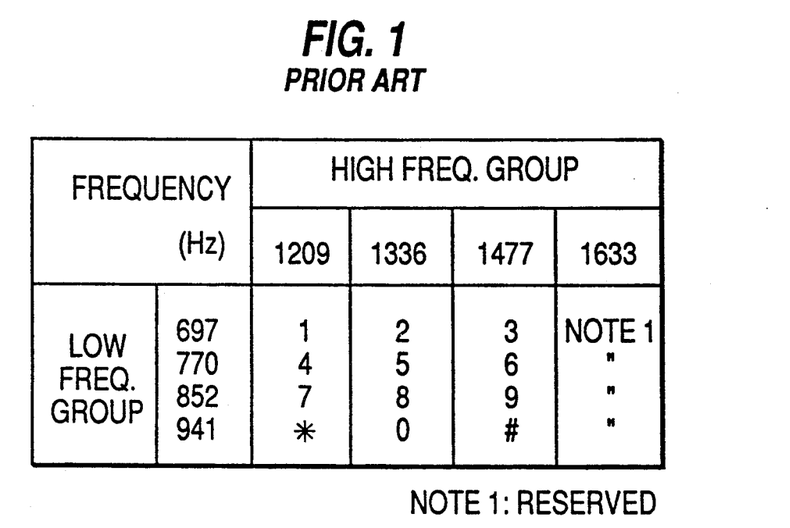
FIG. 1 shows a table of a frequency allocation structure in the 4×4 signal method used in a push-button telephone system.

FIG. 1 shows a table of a frequency allocation structure in the 4×4 signal method. As clearly seen from FIG. 1, all elemental frequencies in the 4×4 signal method are included in an audio-frequency band.

The most important problem in detecting the PB signal having audio frequency components exists in that the detection error percentage will not vanish because of existence of voice or noise signals.

On the other hand, when the protective measures for reducing the detection error are too excessive, it results in diminishing a normal PB signal and also causing detection error when noises are included in the circuits. Therefore, in a practical application, appropriate protective measures should be considered.

Among preventive measures for reducing detection error, a method in which a third Formant is emphasized, is considered to be the most effective way and has been widely used in Japan.

Because vowels are apt to be the cause of detection error, a spectrum structure of vowel has attracted particular attention in the 4×4 PB signal method. The above method of emphasizing the third Formant is one of solutions for reducing detection error due to the vowel [a:] with high efficiency.

Figure 2:
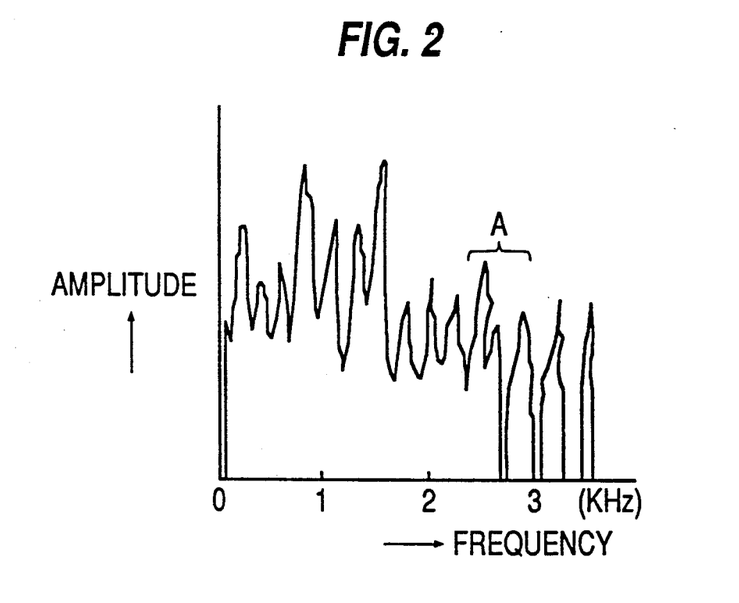
FIG. 2 shows an example of a spectrum of the vowel [a:], which often becomes the cause of detection error.

FIG. 2 shows a typical spectrum pattern of the vowel, for example, [a:], which often becomes a cause of detection error.

With regard to the spectrum shown in FIG. 2, the third Formant, known as a frequency range of 2.5 to 3.0 KHz denoted by a reference A, is considered to be the cause of detection error. In the known existing system, the PB signal is first input to a third Formant emphasizer and subsequently to a limiter. It is known that the emphasized component works as a negative factor in recognizing the signal as a PB signal in detection and, therefore, this method works fairly effective for reducing the detection error.

Figure 3:
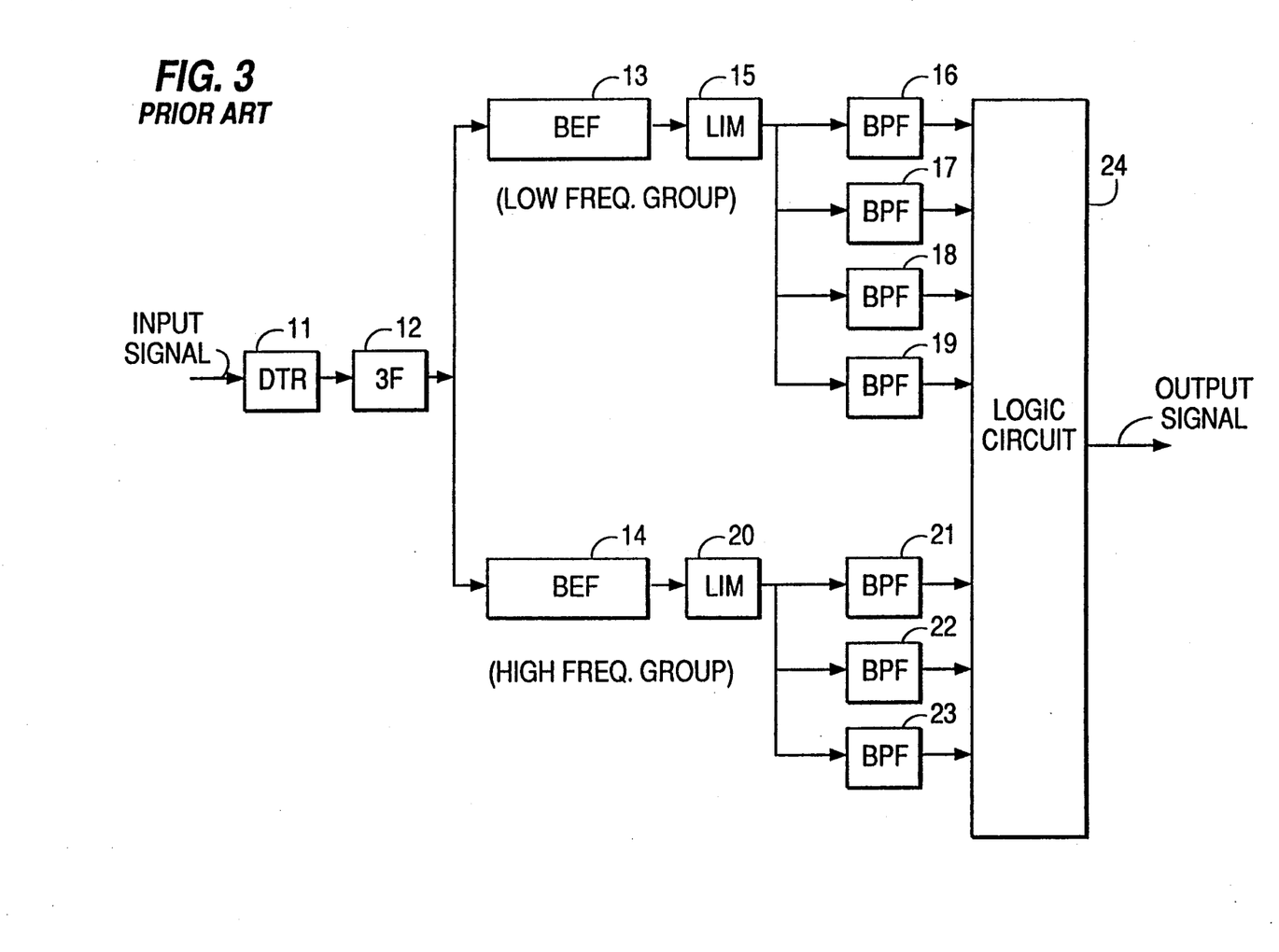
FIG. 3 is an example of a block diagram of an existing PB signal detection system utilizing a third Formant emphasizer.

FIG. 3 shows an example of a block diagram of the existing PB signal detection system utilizing the third Formant emphasizer.

In FIG. 3, an input signal is applied to a dialtone remover (DTR) 11, in which the dialtone is suppressed. The output signal from the DTR 11 is applied to a third Formant emphasizer (3F) 12, where the third Formant is emphasized. The output of the third Formant emphasizer 12 is applied to both a band elimination filter (BEF) 13 and a band elimination filter (BEF) 14, where signals of the high frequency group are cut off by BEF 13, and signals of the low frequency group is cut off by BEF 14 respectively.

The output of BEF 13 is applied to a limiter (LIM) 15 and, after the amplitude is limited, it is further applied to band pass filters (BPF) 16, 17, 18 and 19, each having a specified pass band around frequencies of, i.e., 697 Hz, 770 Hz, 852 Hz and 941 Hz respectively of the low frequency group. When the input signal comprises anyone of above elemental frequencies, it is extracted and is output to a logic circuit 24.

In the similar way, the output of BEF 14 is applied to a limiter (LIM) 20 and, after the amplitude is limited, it is further applied to band pass filters (BPF) 21, 22 and 23, each having a specified pass band around frequencies of, i.e., 1209 Hz, 1336 Hz and 1477 Hz respectively of the high frequency group. When the input signal comprises anyone of above elemental frequencies, it is extracted and is output to the logic circuit 24.

In a logic circuit 24, a combination of the two frequencies from the band pass filters of low and high groups is checked, and the logic circuit outputs a signal corresponding to the numeral or other functional key on a pushphone.

In PB signal detection system, a detection error percentage has been considered to be allowable up to the same level as the dialing error percentage. Under this condition, the existing PB signal detection system as shown in FIG. 3 can satisfy the above condition and can perform sufficient function. However, recently it becomes still more necessary to detect PB signal with detection error as few as possible.

In a high speed packet communication, for example, PB signal detection is required to be more precise. Further, a new telephone service such as an audio-response service has been under way which includes a problem of detection error.

Figure 4:
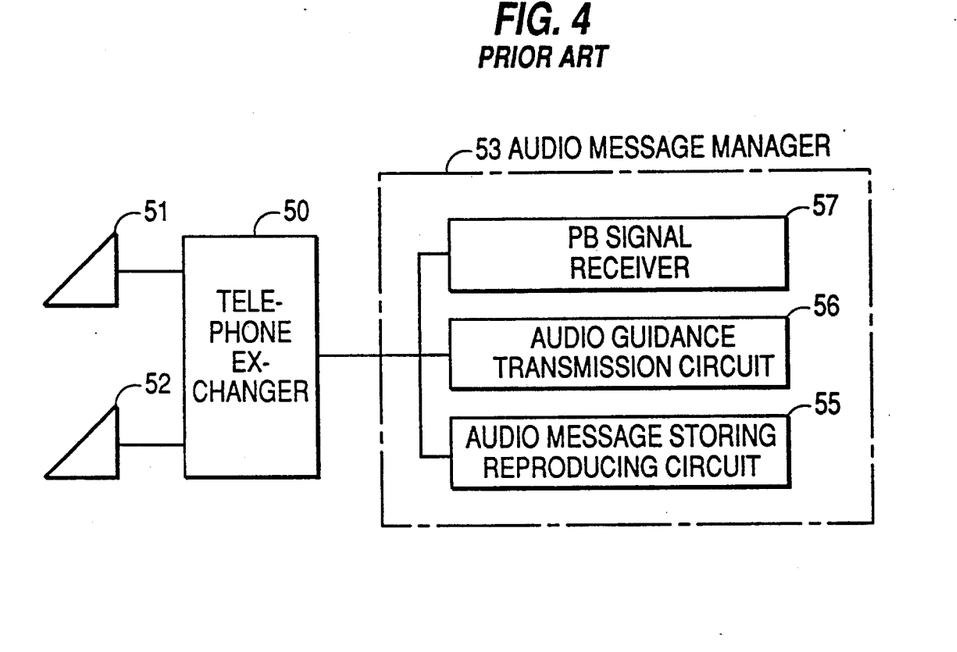
FIG. 4 is a schematic block diagram for explaining a system for an audio-response service in telephone network.

With regard to the audio-response service, a short explanation is given herein. FIG. 4 is a schematic block diagram of the audio-response service. Assuming that one subscriber terminal 51, for instance, calls another terminal 52, and there is no one to attend the terminal 52, a telephone exchanger 50 connects the terminal 51 to an audio message manager 53, which includes an audio message storing and reproducing circuit 55, an audio guidance transmission circuit 56 and a PB signal receiver 57. The audio guidance transmission circuit 56 first sends an audio guidance message to the subscriber of terminal 51 to input the caller's and the partner's telephone numbers by push-button operation. With this guidance, PB signal receiver 57 is made active for receiving the PB signal. Thereafter, an audio message from the terminal 51 is recorded in the audio message storing and reproducing circuit 55. Later on, the audio message manager 53 calls the partner's terminal 52 and transmits the recorded audio message.

In the system used for audio-response service, voice signal and other noise signals introduced to the PB signal from the subscriber terminal 51 and/or the reproduced audio message from the audio message storing and reproducing circuit 55 will easily become the cause of detection error for the PB signal.

In order to reduce the PB signal detection error, Japanese Unexamined Patent Publication Tokkaihei-1-243690 published on Sep. 28, 1989 by O. Aiiso discloses that the input signal is subjected to a band elimination filter, which interrupts transmission of the signal in the PB signal band covering both low and high frequency groups and, if the output signal from the band elimination filter is detected to have frequency components outside the PB signal band, the input signal is regarded as a signal other than the PB signal and the input signal is not transmitted to the PB signal receiver.

Japanese Unexamined Patent Publication Tokkaihei-1-138889 by H. Takeshita published on May 31, 1989 discloses a PB signal detection circuit comprises a Discrete Fourier Transform (DFT) circuit and a threshold value determination circuit and a judging circuit, wherein the spectrum of an input signal in the low frequency band, such as lower than 1000 Hz, is analyzed by the DFT circuit and, when the number of spectrums exceeding the threshold value is larger than a predetermined number, the input signal is judged to be a voice signal. Japanese Unexamined Patent Publication Tokkaihei-1-188194 by H. Takeshita published on Jul. 27, 1989 discloses the similar PB signal detection circuit as described above except that the DFT circuit in the latter invention is provided for analyzing the signal in the high frequency band, such as between 1100 Hz and 3000 Hz.

SUMMARY OF THE INVENTION

It is an object of the present invention to provide a multi-frequency signal receiver which has a low percentage in detection error when noises are included in the multi-frequency signal.

It is another object of the present invention to provide a PB signal receiver which has a low percentage in detection error when voice or noise signals are included in the push-button signal.

It is still another object of the present invention to provide an amplitude variation supervisory circuit, which is always monitoring amplitude variations of an input signal and judges the input signal to be a signal other than the multi-frequency signal when the amplitude variation exceeds a specified threshold value.

It is still further object of the present invention to provide an economical PB signal receiver with low detection error by adding a simple supplementary circuit.

The above objects are achieved by a multi-frequency signal receiver of the present invention comprising a detector circuit and an amplitude variation supervisory circuit, wherein the detector circuit comprises a group of band pass filters, each having a pass band corresponding to each elemental frequency signal included in the multi-frequency signal, and a logic circuit for receiving each output from the band pass filters and outputting detected data of the multi-frequency signal, and wherein the amplitude variation supervisory circuit comprises means for monitoring absolute amplitude of an input signal for a predetermined period and means for detecting and holding the maximum value of the monitored amplitude, and means for judging the input signal to be other than the multi-frequency signal when absolute amplitude of said input signal exceeds the level calculated by the maximum amplitude value.

Details of other modifications will become clear from a reading of the detailed description of the invention with reference to the drawings.

BRIEF DESCRIPTION OF THE DRAWINGS

Same or like reference numerals designate same or corresponding parts throughout the drawings.

DETAILED DESCRIPTION OF THE PREFERRED EMBODIMENTS

In the present invention, the fact that there is a difference between amplitude variations of multi-frequency signal and other signals such as voice and/or noise signals, is utilized for reducing the detection error. In the known method of reducing detection error, signal components of voice or noise signal, which has frequency distribution outside the multi-frequency signal band, is utilized. Amplitude variation of the multi-frequency signal is much less than that of the voice or noise signal. In the following embodiments, PB signal receiver is taken up as a typical multi-frequency signal receiver.

The PB signal is a combination of two sinusoidal waves of different frequency which is explained previously using the table of FIG. 1. The PB signal is generated when one presses the push-button on a pushphone, and the signal continues for about 40 ms with almost constant amplitude. Therefore, if voices or noises are not included in the PB signal during the transmission of the signal, it is considered that the amplitude of the signal is almost constant and the variation thereof is negligible. Even if noises are included, the amplitude variation of noises is smaller than that of voices.

Figure 5:
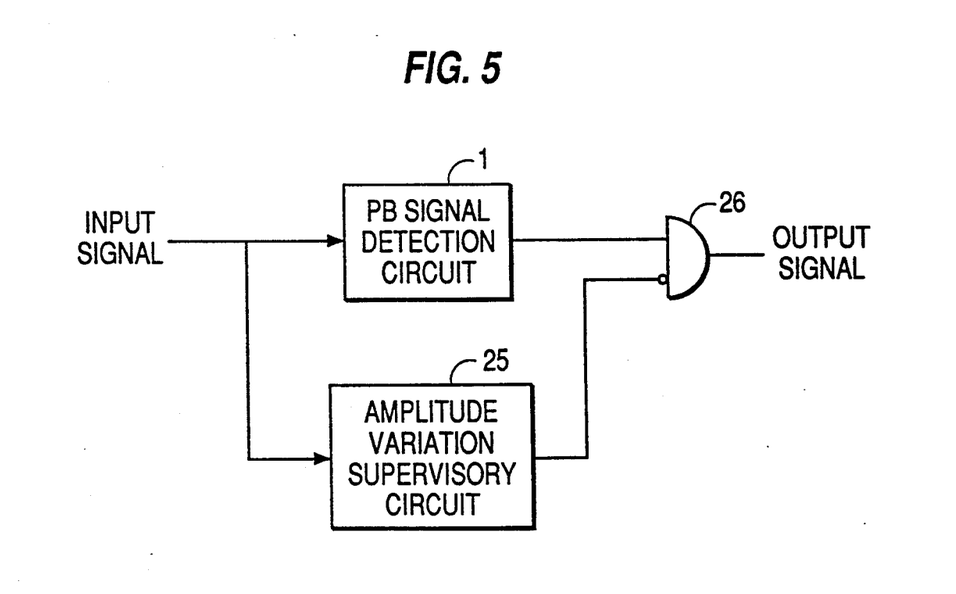
FIG. 5 is a basic block diagram of a multi-frequency signal receiver of the present invention.

In the present invention, as shown schematically in FIG. 5, an amplitude variation supervisory circuit 25 is added to the PB signal detection circuit 1. The amplitude supervisory circuit 25 is always watching amplitude variation of the input signal and, when the amplitude of the input signal exceeds a threshold value, which is the maximum amplitude multiplied by a specified ratio within a predetermined time interval, the input signal is judged to be a signal other than a PB signal.

Figure 6A:
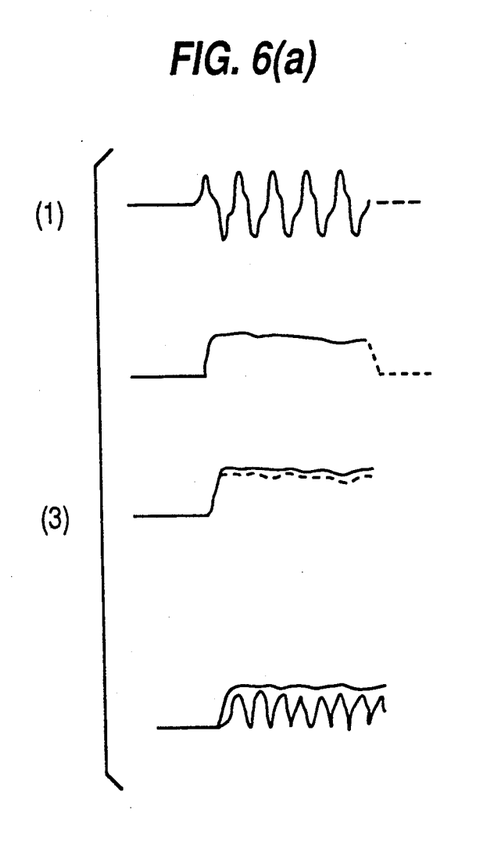
FIGS. 6(a) and 6(b) show typical waveforms in an amplitude variation supervisory circuit of the present invention, wherein waveforms of FIG. 6(a) show when the input signal is a PB signal and those of FIG. 6(b) show when the signal is a voice signal.
Figure 6B:
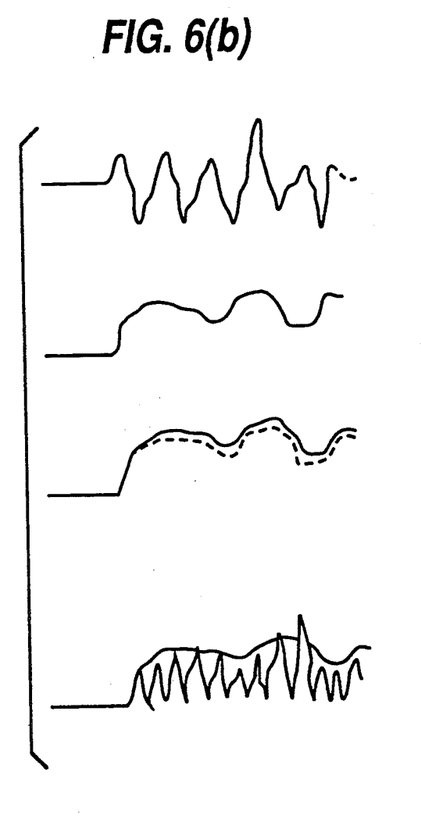

Figures 6(a) and 6(b) show waveforms in the amplitude supervisory circuit of the present invention when the PB signal and the voice signal respectively are input thereto.

Figures in each row show the waveforms at the same point in the circuit. FIGS. in the first row (1) show an input signal, and those in the second row (2) show absolute values of the amplitude for the PB signal and the voice signal respectively. In case of the PB signal, the amplitude is almost constant, however, in case of the voice signal, the variation is comparatively large. In the third row (3) of FIGS. 6(a) and 6(b), dotted curves show the maximum value of the amplitude within a predetermined period obtained in figures of row (2), and solid curves of row (3) show the threshold value for a purpose of detection, which is obtained multiplying the maximum value of the absolute amplitude (dotted curve) by the specified ratio. In each figure in the fourth row (4), both curves of the absolute amplitude of the input signal and the threshold value level obtained in row (3) are shown. In case of the PB signal, variation of amplitude is small and no peak appears exceeding the threshold curve. In case of the voice signal, amplitude variation of the input signal is large and the probability of the peak appearance exceeding the threshold level is high.

The present invention provides the amplitude variation supervisory circuit which detects the exceeding of the input signal over the threshold level. The threshold valve is given by multiplying the maximum absolute amplitude of the input signal within a predetermined period by the specified ratio. When the exceeding of the signal is detected in the amplitude variation supervisory circuit 25 of FIG. 5, the input signal is not regarded as the PB signal and the amplitude variation supervisory circuit 25 outputs a signal of prohibiting level to a gate 26. And an output from a logic circuit (not shown) in the PB signal detection circuit 1 of FIG. 5 is prohibited by the gate 26. Therefore, detection error percentage for the PB signal is remarkably reduced compared with the prior art method.

Figure 7:
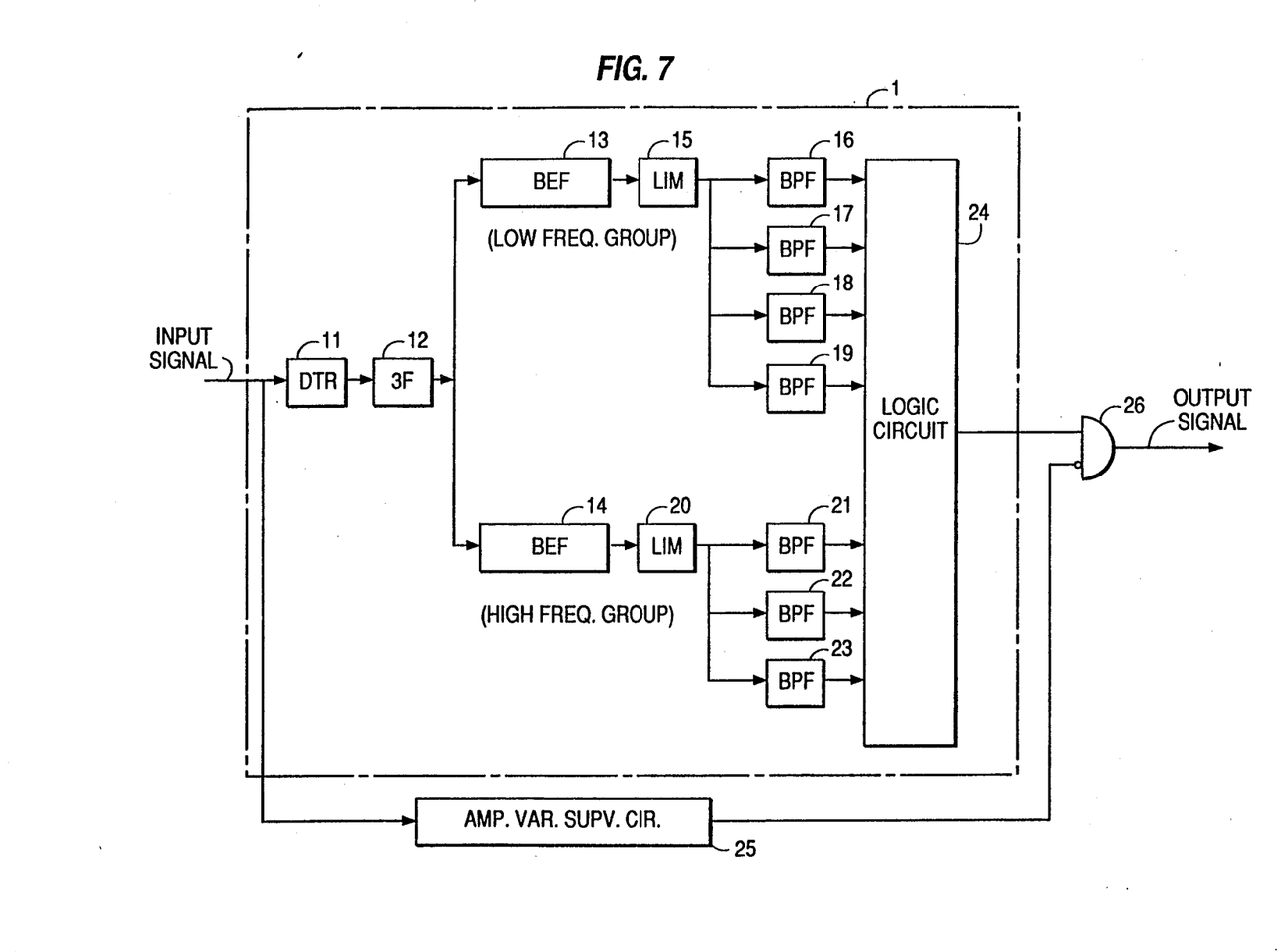
FIG. 7 is a detailed block diagram of an embodiment of the present invention.

FIG. 7 is a detailed block diagram of an embodiment of the present invention. The same or similar parts used in FIG. 3 are designated by the same reference numerals. In FIG. 7, an amplitude variation supervisory circuit 25 and a gate 26 are added to the structure of FIG. 3.

As in the similar way as explained with regard to FIG. 3, a dial tone comprised in an input signal is suppressed in a dialtone remover circuit (DTR) 11 and a third Formant of the input signal is emphasized in an emphasizer (3F) 12. The input signal is thereafter input to a band elimination filter (BEF) 13, where a high frequency component comprised in the input signal is cut off. The input signal is also input to a band elimination filter (BEF) 14, where a low frequency component comprised in the input signal is cut off. The output of BEF 13 is applied to a limiter (LIM) 15, where the amplitude thereof is limited, and thereafter applied to a plurality of band pass filters BPF 16, 17, 18 and 19, each having a pass band of low frequency group of the PB signal. When the input signal is the PB signal, one elemental frequency component in low frequency group is extracted. In the similar way, the output of BEF 14 is input to a limiter (LIM) 20, where the amplitude thereof is limited, and thereafter applied to a plurality of band pass filters (BPF) 21, 22 and 23, each having a pass band of high frequency group. When the input signal is the PB signal, one elemental frequency component of high frequency group is extracted.

From a combination of two elemental frequency components from the band pass filters of low and high frequency groups, a logic circuit 24 outputs a signal representing the numeral or other functional key of pushphone.

The amplitude variation supervisory circuit 25 detects whether the input signal thereto exceeds the threshold value which is obtained using the maximum amplitude of the input signal within a predetermined period. When the threshold value is exceeded, the amplitude variation supervisory circuit 25 generates an output of, for example, a high level which means the input signal is a voice signal.

The gate 26 prohibits from transmitting the signal from the logic circuit 24 therethrough when the amplitude variation supervisory circuit 25 outputs a high level signal. Therefore, the PB signal detection system of FIG. 7 prevents a false detection of the PB signal caused by a voice signal.

In a preferred embodiment of the present invention, when an input signal is detected to have an amplitude exceeding a threshold value of 1.25 times as large as the maximum amplitude in a 4 ms period, the input signal is regarded as a voice. Thus the specified ratio is preferably 1.25. As a result, a detection error percentage is reduced to about 1/1.5 compared with the prior art method, and effects of the present invention is remarkable.

Figure 8:
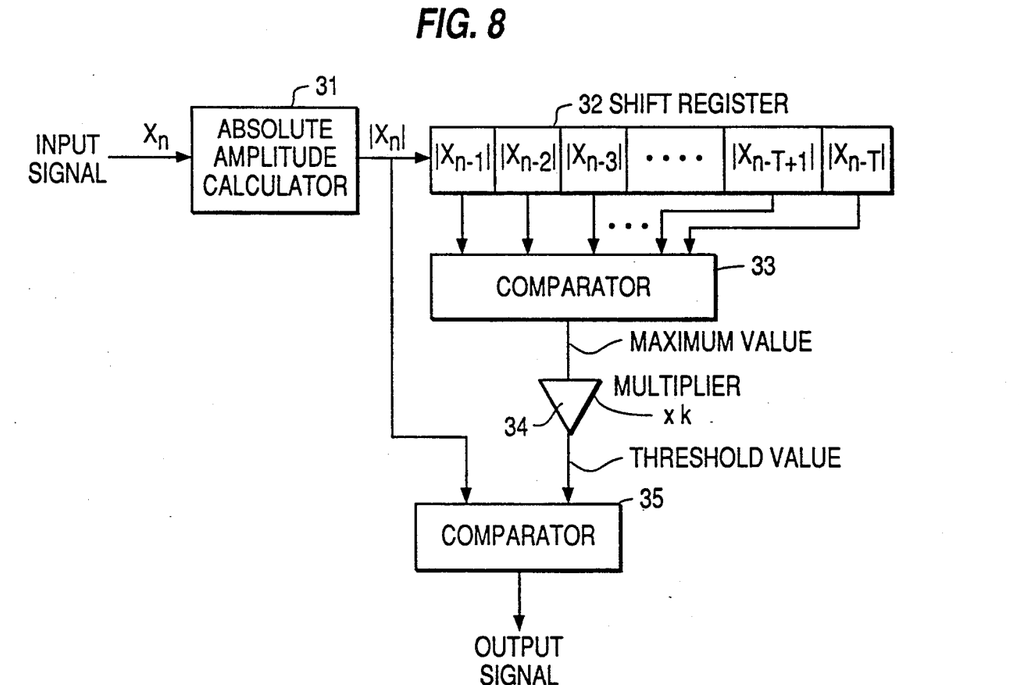
FIG. 8 is a detailed block diagram of an amplitude variation supervisory circuit of the present invention.

FIG. 8 is a detailed block diagram of the amplitude variation supervisory circuit. The input signal is input to an absolute amplitude calculator 31, where the absolute amplitude value is measured. The absolute amplitude data is input to a shift register 32, and a comparator 33 detects the maximum value among the sequentially stored data in the shift register 32. The detected maximum value is multiplied in a multiplier 34 forming a threshold value and the absolute amplitude of the input signal is finally compared with the threshold value in a comparator 35.

Explaining FIG. 8 in more detail, the absolute value calculator 31 calculates an absolute value $|x_n|$, for example, every 125 us. The shift register 32 stores sequentially the absolute data such as $|x_{n-T}|$, $|x_{n-T+1}|$, the ... $|x_{n-2}|$ and $|x_{n-1}|$. The comparator 33 detects maximum value among the plural data, for example, thirty-two data stored in the shift register 32. The multiplier 34 multiplies a constant k to the detected maximum data from the comparator 33, forming the threshold value. The comparator 35 outputs only when the output $|X_n|$ from the absolute amplitude calculator 31 exceeds the threshold value from the multiplier 34.

The output from the comparator 33 gives the maximum amplitude value of the input signal during an interval determined by a capacity of the shift register 32. In this embodiment, the interval is about 4 ms. The comparator 35 detects whether the amplitude of the input signal exceeds the threshold value, which is given by the output from the comparator 33 multiplied by the constant ratio k. When the amplitude of the input signal exceeds the threshold level, it is judged that the input signal is not a PB signal but a voice signal.

The presently disclosed embodiments are therefore to be considered in all respects as illustrative and not restrictive, the scope of the invention being indicated by the appended claims, rather than the foregoing description, and all changes which come within the meaning and range of equivalence of the claims are, therefore, to be embraced therein.

What is claimed is:

1. A multi-frequency signal receiver for detecting a multi-frequency signal in an input signal, said receiver comprising:
   a detector circuit for detecting the input signal, and
   an amplitude variation supervisory circuit comprising:
      amplitude means, connected to the detector circuit, for measuring an amplitude of the input signal to determine an input signal amplitude,
      peak holding means for detecting and holding a maximum value of the input signal amplitude for a predetermined period of time, and
      judging means for detecting when the input signal amplitude exceeds the maximum value of the input signal amplitude held for the predetermined period of time to determine if the input signal is not the multi-frequency signal.

2. A multi-frequency signal receiver as recited in claim 1, wherein the multi-frequency signal is a combination of first and second audio frequency signals, the first audio frequency signal selected among signals of a low frequency group and the second audio frequency signal selected among signals of a high frequency group.

3. A multi-frequency signal receiver as recited in claim 2, wherein the first and second audio frequency signals are of push-button telephone frequencies.

4. A multi-frequency signal receiver as recited in claim 2, wherein said detector circuit comprises:
   a first group of band pass filters, each having a pass band corresponding to the first audio frequency signals in the low frequency group and a second group of band pass filters, each having a pass band corresponding to the second audio frequency signals in the high frequency group,
   a logic circuit, connected to said band pass filters of the first and second groups, to output the detected signal indicative of the multi-frequency signal, and
   a gate circuit operatively connected to said logic circuit and said amplitude variation supervisory circuit to pass the detected signal output of said logic circuit when the input signal amplitude exceeds the maximum value of the input signal amplitude.

5. A multi-frequency signal receiver as recited in claim 4, wherein said detector circuit further comprises a third Formant emphasizing circuit connected to receive the input signal.

6. A multi-frequency signal receiver as recited in claim 5, wherein said detector circuit further comprises means for removing a dialtone signal from the input signal prior to when the third Formant emphasizing circuit receives the input signal.

7. A multi-frequency signal receiver as recited in claim 1, wherein said judging means comprises means for detecting when the input signal amplitude exceeds a threshold value corresponding to the maximum value of the input signal amplitude multiplied by a specified ratio.

8. A multi-frequency signal receiver according to claim 7, wherein the specified ratio is greater than one.

9. A multi-frequency signal receiver as recited in claim 1, wherein said peak holding means comprises a peak-hold circuit.

10. A multi-frequency signal receiver as recited in claim 9, wherein said peak holding means comprises:
    a shift register connected to sequentially receive and store the input signal amplitude, and
    comparing means for comparing the input signal amplitudes stored in the shift register to determine a maximum input signal amplitude among those stored in the shift register and for holding the maximum input signal amplitude.

11. A multi-frequency signal receiver as recited in claim 10, wherein said amplitude means comprises absolute amplitude calculation means for measuring an absolute value of the input signal to determine the input signal amplitude.

12. A system for detecting a push-button signal having a push-button signal detection circuit for detecting the push-button signal and outputting a detected signal, wherein the push-button signal comprises a combination of first and second audio-frequency signals of a low frequency group and a high frequency group, respectively, said system comprises:
    an amplitude variation supervisory circuit connected to receive an input signal comprising the push-button signal and generate an output indicative of whether or not said input signal has an amplitude greater than a threshold value, the threshold value being a product of a maximum value of the input signal amplitude over the predetermined period of time and a specified ratio, and
    a gate circuit connected to pass the detected signal output of the push-button signal detection circuit based on the output of said amplitude variation supervisory circuit.

13. A push-button signal detection system as recited in claim 12, wherein said amplitude variation supervisory circuit comprises:
    amplitude means for measuring an amplitude of the input signal to determine an input signal amplitude,
    peak holding means for detecting and holding a maximum value of the input signal amplitude for a predetermined period of time, and
    judging means for detecting when the input signal exceeds the maximum value of the input signal amplitude held for the predetermined period of time.

14. A push-button signal detection system as recited in claim 13, wherein said peak holding means comprises:
    a shift register connected to sequentially receive and store the input signal amplitude, and
    comparing means for comparing the input signal amplitudes stored in the shift register to determine a maximum input signal amplitude among those stored in the shift register and for holding the maximum input signal amplitude.

15. A multi-frequency signal receiver as recited in claim 14, wherein said amplitude means in the amplitude variation supervisory circuit comprises absolute amplitude calculation means for measuring an absolute value of the input signal to determine the input signal amplitude.

16. A push-button signal detection system as recited in claim 12, wherein said push-button signal detection circuit comprises a first group of band pass filters, each having a pass band corresponding to the first audio frequency signals in the low frequency group and a second group of band pass filters, each having a pass band corresponding to the second audio frequency signals in high frequency group, and     a logic circuit, connected to said band pass filters of the first and second groups, to output the detected signal indicative of the push-button signal.

17. A push-button signal detection system as recited in claim 16, wherein said push-button signal detection circuit comprises a third Formant emphasizing circuit connected to receive the push-button signal.

18. A push-button signal detection system as recited in claim 17, wherein said push-button signal detection circuit further comprises means for removing a dialtone signal from the push-button signal prior to when the third Formant emphasizing circuit receives the push-button signal.

19. A method of receiving a multi-frequency signal of an audio-frequency band from an input signal utilizing a multi-frequency signal receiver, said method comprising the steps of:

(a) measuring an amplitude of the input signal to determine an input signal amplitude, (b) detecting and holding a maximum value of the input signal amplitude for a predetermined period of time, and (c) detecting when the input signal amplitude exceeds the maximum value of the input signal amplitude held for the predetermined period of time to determine if the input signal is not the multi-frequency signal.

20. A method of receiving a multi-frequency signal as recited in claim 19, wherein said multi-frequency signal comprises push-button telephone frequency signals, and wherein the multi-frequency signal receiver comprises a push-button signal detection circuit and an amplitude variation supervisory circuit, said method further comprising the step of:

(d) disabling the push-button signal detection circuit when the input signal exceeds the maximum value of the input signal amplitude.

21. A method according to claim 19, wherein said step (c) comprises the step of (c1) detecting when the input signal amplitude exceeds a threshold value corresponding to the maximum value of the input signal amplitude multiplied by a specified ratio greater than one.

22. A multi-frequency signal receiver for detecting a multi-frequency signal in an input signal, said receiver comprising:

amplitude means for measuring an amplitude of the input signal to determine an input signal amplitude,     peak holding means for detecting and holding a maximum value of the input signal amplitude for a predetermined period of time, and     judging means for detecting when the input signal amplitude exceeds the maximum value of the input signal amplitude held for the predetermined period of time to determine if the input signal is not the multi-frequency signal.

23. A multi-frequency signal receiver according to claim 22, wherein said judging means comprises means for detecting when the input signal amplitude exceeds a threshold value corresponding to the maximum value of the input signal amplitude multiplied by a specified ratio greater than one.

* * * * *

UNITED STATES PATENT AND TRADEMARK OFFICE
CERTIFICATE OF CORRECTION

PATENT NO. : 5,214,693
DATED : May 25, 1993
INVENTOR(S) : Kaoru CHUJO

It is certified that error appears in the above-indentified patent and that said Letters Patent is hereby corrected as shown below:

Col. 6, line 30, after "voice" insert --signal--;
       line 49, delete "the" (second occurrence).

Signed and Sealed this

Tenth Day of May, 1994

Attest:

BRUCE LEHMAN

*Attesting Officer*      *Commissioner of Patents and Trademarks*